United States Patent
Chao

(10) Patent No.: US 10,724,571 B2
(45) Date of Patent: Jul. 28, 2020

(54) STRUCTURE OF SCREW

(71) Applicant: Ying-Chin Chao, Kaohsiung (TW)

(72) Inventor: Ying-Chin Chao, Kaohsiung (TW)

(*) Notice: Subject to any disclaimer, the term of this patent is extended or adjusted under 35 U.S.C. 154(b) by 61 days.

(21) Appl. No.: 16/045,776

(22) Filed: Jul. 26, 2018

(65) Prior Publication Data

US 2018/0328399 A1 Nov. 15, 2018

Related U.S. Application Data

(62) Division of application No. 15/263,377, filed on Sep. 13, 2016, now abandoned.

(51) Int. Cl.
| | | |
|---|---|---|
| *F16B 39/282* | (2006.01) | |
| *F16B 39/30* | (2006.01) | |
| *F16B 25/00* | (2006.01) | |
| *F16B 39/00* | (2006.01) | |

(52) U.S. Cl.
CPC ............ *F16B 39/282* (2013.01); *F16B 25/00* (2013.01); *F16B 39/00* (2013.01); *F16B 39/30* (2013.01)

(58) Field of Classification Search
CPC .. F16B 25/00; F16B 25/0047; F16B 25/0057; F16B 25/0068; F16B 25/10; F16B 37/14; F16B 39/282; F16B 39/30; F16B 41/002; F16B 41/005; F16B 33/002; F16B 39/00
USPC .......... 411/372.5, 373, 387.2, 399, 402, 411, 411/412
See application file for complete search history.

(56) References Cited

U.S. PATENT DOCUMENTS

| | | | | |
|---|---|---|---|---|
| 388,000 | A * | 8/1888 | Rider ...................... | F16B 35/06 411/399 |
| 1,088,892 | A * | 3/1914 | Foreman ................. | F16B 25/00 411/418 |
| 1,801,186 | A * | 4/1931 | Arenz ..................... | F16B 15/06 411/394 |
| 3,238,836 | A * | 3/1966 | Johnson ............... | F16B 25/0052 411/387.4 |
| 4,854,311 | A * | 8/1989 | Steffee ............... | A61B 17/7058 606/66 |
| 5,061,135 | A * | 10/1991 | Pritchard ............ | F16B 25/0015 411/411 |
| 5,110,245 | A * | 5/1992 | Hiroyuki ............. | F16B 25/0015 411/417 |
| 5,735,653 | A * | 4/1998 | Schiefer .............. | E21D 21/0026 405/259.6 |
| 5,827,030 | A * | 10/1998 | Dicke ................. | F16B 25/0015 411/387.4 |

(Continued)

*Primary Examiner* — Roberta S Delisle
(74) *Attorney, Agent, or Firm* — Leong C. Lei

(57) ABSTRACT

A screw includes a screw cap and a shank extending downward from the screw cap. The shank has an outer circumferential surface on which a thread is formed. The shank has a lower end forming a tip section. The screw cap is extended downward to form a conic section. The conic section is provided thereon with a reverse prevention mechanism, which is constructed to include at least one step structure. After the screw is screwed into a workpiece, in an attempt to screw the screw out of the workpiece, the reverse prevention mechanism providing a blocking and resisting effect to prevent the screw from being readily screwed out of the workpiece and thus, a reverse prevention effect of the screw can be enhanced to thereby improve overall performance of use of the screw.

2 Claims, 13 Drawing Sheets

(56) References Cited

U.S. PATENT DOCUMENTS

| | | | | |
|---|---|---|---|---|
| 6,086,303 | A * | 7/2000 | Fluckiger | F16B 5/0275 |
| | | | | 411/399 |
| 6,698,987 | B1 * | 3/2004 | Dicke | F16B 25/0031 |
| | | | | 411/387.4 |
| 6,926,484 | B2 * | 8/2005 | Kram | F16B 25/0031 |
| | | | | 411/311 |
| 7,037,059 | B2 * | 5/2006 | Dicke | F16B 5/0275 |
| | | | | 411/399 |
| 7,101,133 | B2 * | 9/2006 | Dicke | F16B 25/0015 |
| | | | | 411/308 |
| 7,160,073 | B2 * | 1/2007 | Mizuno | F16B 25/0031 |
| | | | | 411/387.4 |

\* cited by examiner

STRUCTURE OF SCREW

CROSS-REFERENCE

This is a division of the co-pending patent application Ser. No. 15/263,377, filed Sep. 13, 2016.

(a) TECHNICAL FIELD OF THE INVENTION

The present invention relates generally to a structure of a screw, and more particularly to a screw structure that prevents a screw from being readily screwed out and loosening in order to enhance a reverse rotation preventing effect and thus improve the overall performance of the screw.

(b) DESCRIPTION OF THE PRIOR ART

A conventional screw 1, as shown in FIG. 1, comprises a screw cap 11 and a shank 12 extending downward from the screw cap 11. The shank 12 has an outer circumferential surface on which an external thread 13 is formed and helically extends around the shank. The shank 12 has a lower end forming a tip 14.

To tighten the screw 1, the tip 14 is first pressed onto a surface of a workpiece and then, a power tool or a hand tool applies a torque, through the screw cap 11, to drive the screw 1 to rotate so that the tip 14 is forced to cut and screw into the workpiece. However, the conventional screw 1, which is so screwed into the workpiece, can also be screwed out with a power tool or a hand tool applying a torque to the screw cap 11 and thus rotating the screw 1. There are applications where it is desired the screw 1 cannot be readily screwed out of the workpiece.

Thus, it is a challenge of the screw manufacturers to provide a screw 1 showing a reverse rotation preventing effect in order to prevent the screw 1 from being readily screwed out of a workpiece.

SUMMARY OF THE INVENTION

The primary object of the present invention is to provide a solution that effectively overcomes the drawback that a conventional screw, due to lacking a reverse rotation mechanism, is readily screwed out.

The technical solution that the present invention adopts to achieve the above object is a structure of a screw, wherein the screw comprises a screw cap and a shank extending downward from the screw cap. The shank has an outer circumferential surface on which a thread is formed. The shank has a lower end forming a tip section. The screw cap is extended downward to form a conic section. The conic section is provided with a reverse prevention mechanism, which is constructed to comprise at least one step structure.

The efficacy that the above technical solution adopted by the present invention may achieve is that a reverse prevention mechanism is provided on a conic section of a screw cap of the screw and the reverse prevention mechanism is constructed to comprise at least one step structure. As such, with the screw being screwed into a workpiece, in an attempt to screw the screw out of the workpiece, the reverse prevention mechanism provides a blocking and resisting effect to prevent the screw from being readily screwed out of the workpiece and thus, the reverse prevention effect of the screw can be enhanced and the overall effectiveness of use of the screw is improved.

The foregoing objectives and summary provide only a brief introduction to the present invention. To fully appreciate these and other objects of the present invention as well as the invention itself, all of which will become apparent to those skilled in the art, the following detailed description of the invention and the claims should be read in conjunction with the accompanying drawings. Throughout the specification and drawings identical reference numerals refer to identical or similar parts.

Many other advantages and features of the present invention will become manifest to those versed in the art upon making reference to the detailed description and the accompanying sheets of drawings in which a preferred structural embodiment incorporating the principles of the present invention is shown by way of illustrative example.

DETAILED DESCRIPTION OF THE PREFERRED EMBODIMENTS

The following descriptions are exemplary embodiments only, and are not intended to limit the scope, applicability or configuration of the invention in any way. Rather, the following description provides a convenient illustration for implementing exemplary embodiments of the invention. Various changes to the described embodiments may be made in the function and arrangement of the elements described without departing from the scope of the invention as set forth in the appended claims.

Figure 1:
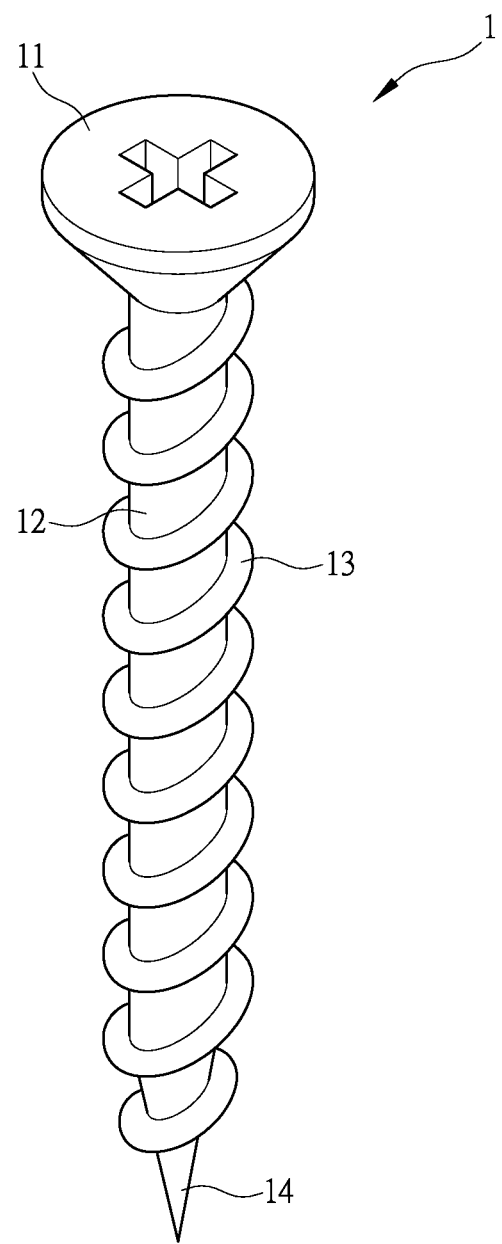
FIG. 1 is a perspective view showing a conventional screw.
Figure 2:
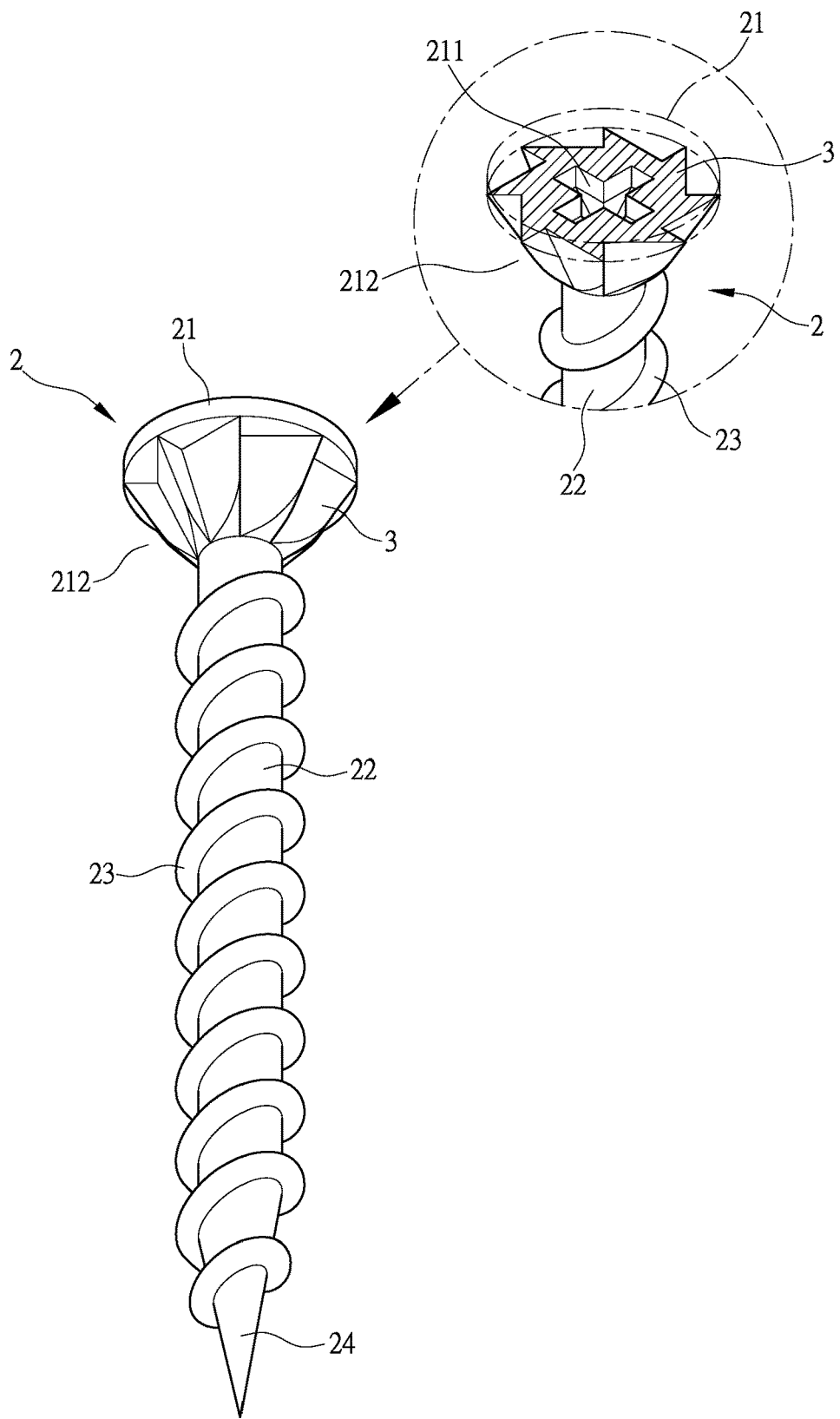
FIG. 2 is a perspective view showing a screw according to the present invention.

Firstly, referring to FIG. 2, the present invention provides a screw 2 that comprises a screw cap 21 and a shank 22 extending downward from the screw cap 21. The shank 22 can be a cylindrical body having a configuration of a cylinder or a triangular prism or, alternatively, the shank 22 comprises a body comprising a combination of a cylindrical section and a triangular prismatic section. The shank 22 has an outer circumferential surface around which a thread 23 is circumferentially formed. The shank 22 has a lower end forming a tip section 24. The thread 23 extends to the tip section 24.

As shown in FIG. 2, the screw cap 21 of the screw 2 has a top end that has a portion that is recessed to form a rotating section 211. The screw cap 21 is extended in a direction toward the shank 22 to form a conic section 212. The conic section 212 is provided thereon with a reverse rotation prevention mechanism 3, which will be referred to as a reverse prevention mechanism for simplification. The reverse prevention mechanism 3 comprises at least one step structure arranged in the direction of the thread 23. As such, when the screw 2 is screwed into a workpiece (not shown in the drawings), the conic section 212 is also screwed, at least partly or entirely, into the workpiece. Thus, when an attempt is made to screw the screw 2 out of the workpiece, the reverse prevention mechanism 3 provides a blocking and resisting effect to prevent the screw 2 from being readily screwed out of the workpiece and thus, the screw 2 shows an enhanced reverse prevention effect.

Figure 3:
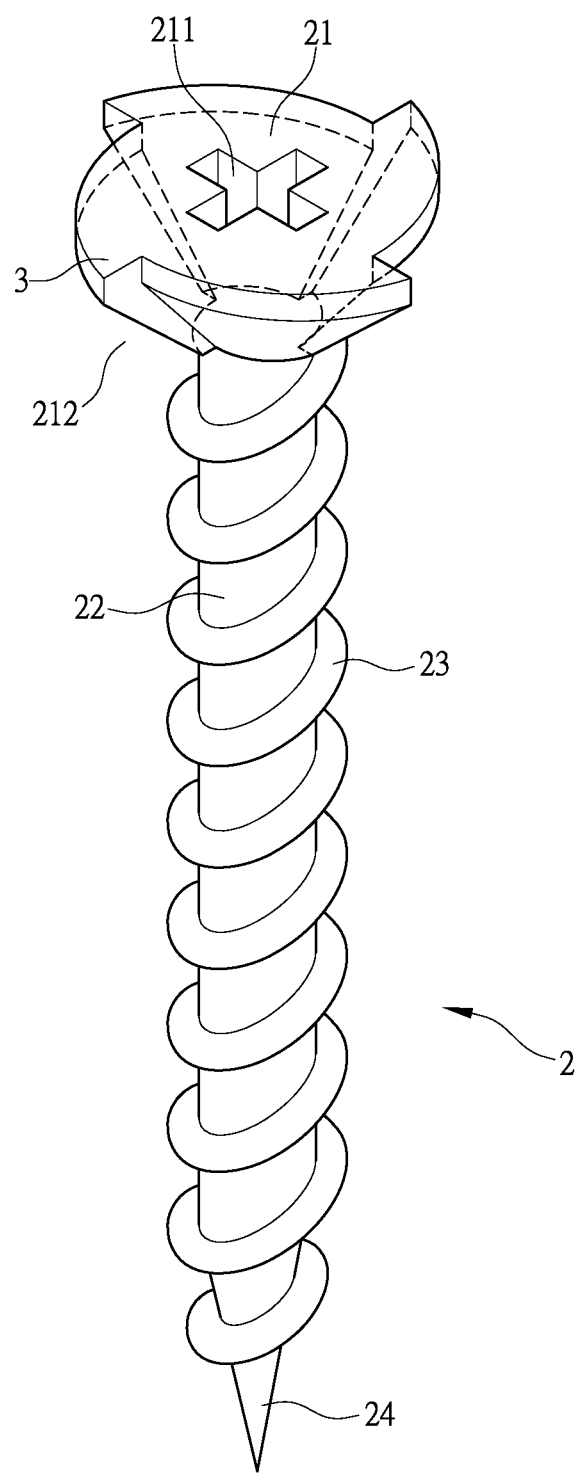
FIG. 3 shows an alternative embodiment of the screw of the present invention shown in FIG. 2.

As shown in FIG. 3, the reverse prevention mechanism 3 that is provided on the conic section 212 of the screw 2 can be extended to the top surface of the screw cap 21 in order to further enhance the reverse prevention effect of the screw 2.

Figure 4:
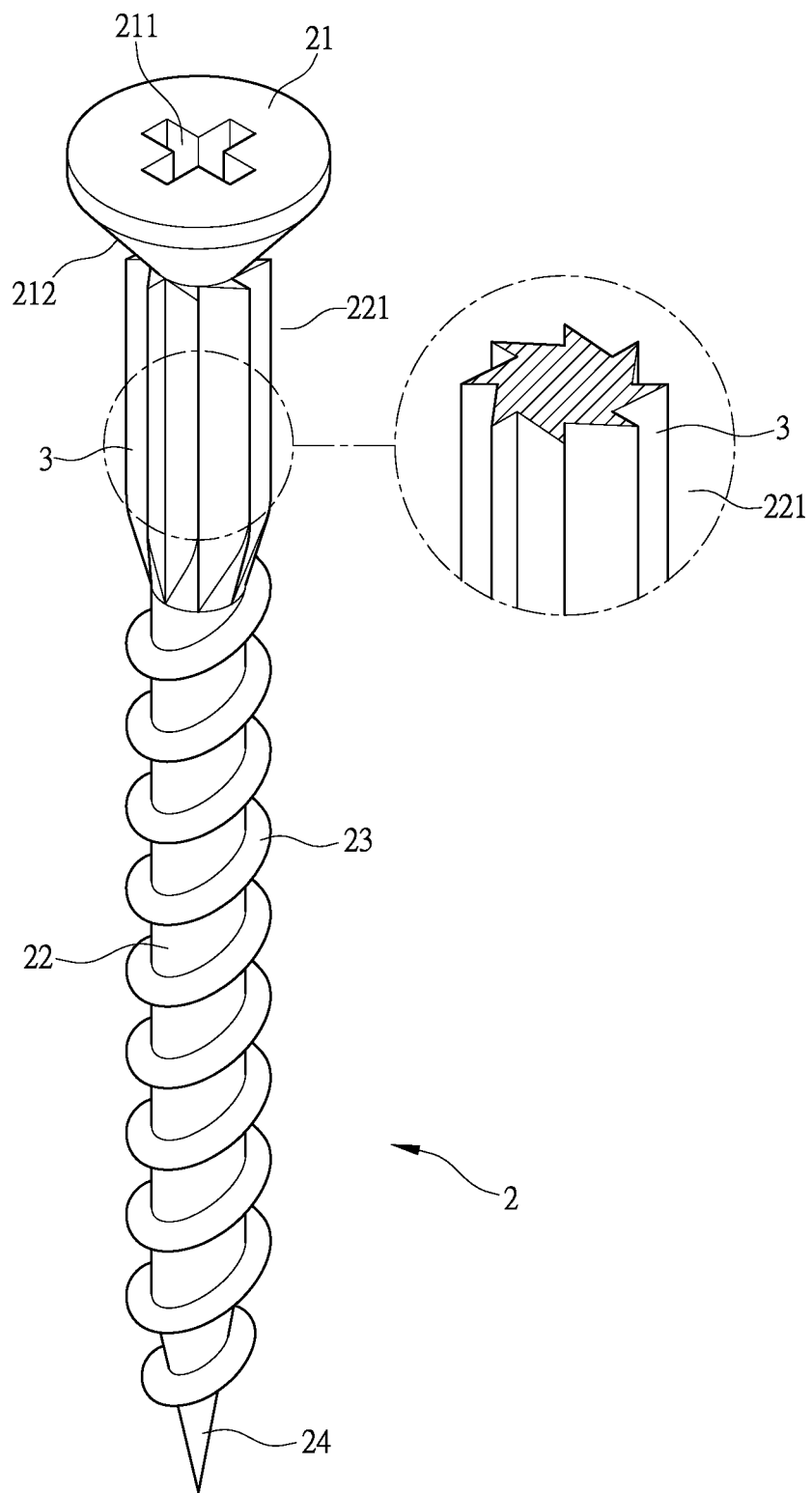
FIG. 4 shows an embodiment in which a reverse prevention mechanism is provided on a neck of a screw body.

As shown in FIG. 4, the shank 22 on the underside of the screw cap 21 of the screw 2 of the present invention may be structured to comprise a thread-free neck section 221, and the thread 23 may be arranged to extend from a lower side of the neck section 221 to the tip section 24. The neck section 221 is provided with a reverse prevention mechanism 3, and more specifically, the reverse prevention mechanism 3 is arranged between a lower end of the conic section 212 of the screw cap 21 and an upper end of the thread 23. The reverse prevention mechanism 3 is constructed to comprise at least one step structure that is arranged in a longitudinal direction of the shank 22. As such, when the screw 2 is screwed in to a workpiece, the neck section 221 is also screwed, at least partly, into the workpiece. Thus, when an attempt is made to screw the screw 2 out of the workpiece, the reverse prevention mechanism 3 provides a blocking and resisting effect to prevent the screw 2 from being readily screwed out of the workpiece and thus, the screw 2 shows an enhanced reverse prevention effect.

Figure 5:
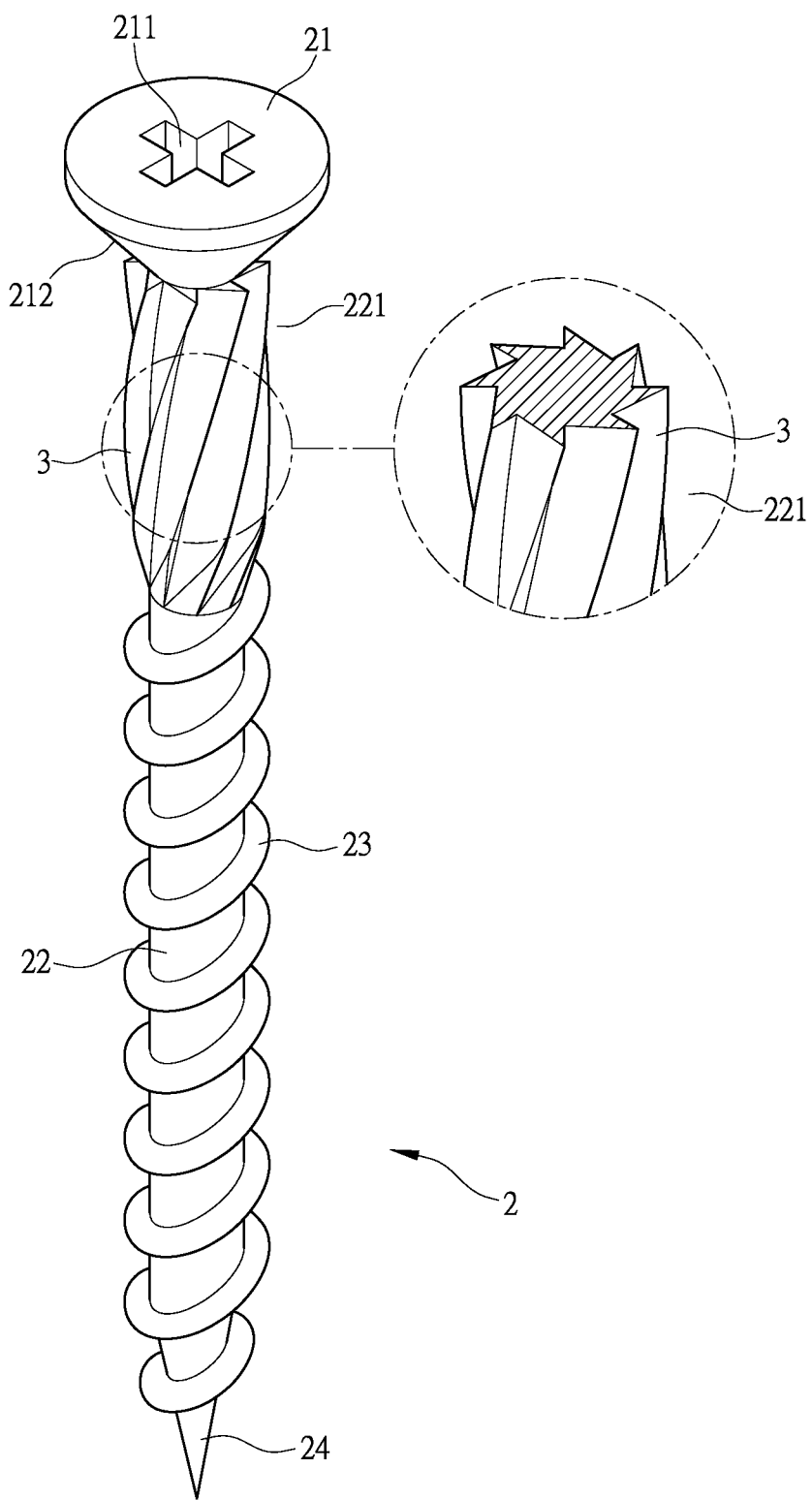
FIG. 5 shows another embodiment in which a reverse prevention mechanism is provided on a neck of a screw body.

As shown in FIG. 5, a reverse prevention mechanism 3 that is arranged between a lower end of the conic section 212 of the screw cap 21 and an upper end of the thread 23 is constructed to comprise at least one step structure that is inclined with respect to a longitudinal direction of the shank 22 so as to enhance a reverse prevention effect of the screw 2.

Figure 6:
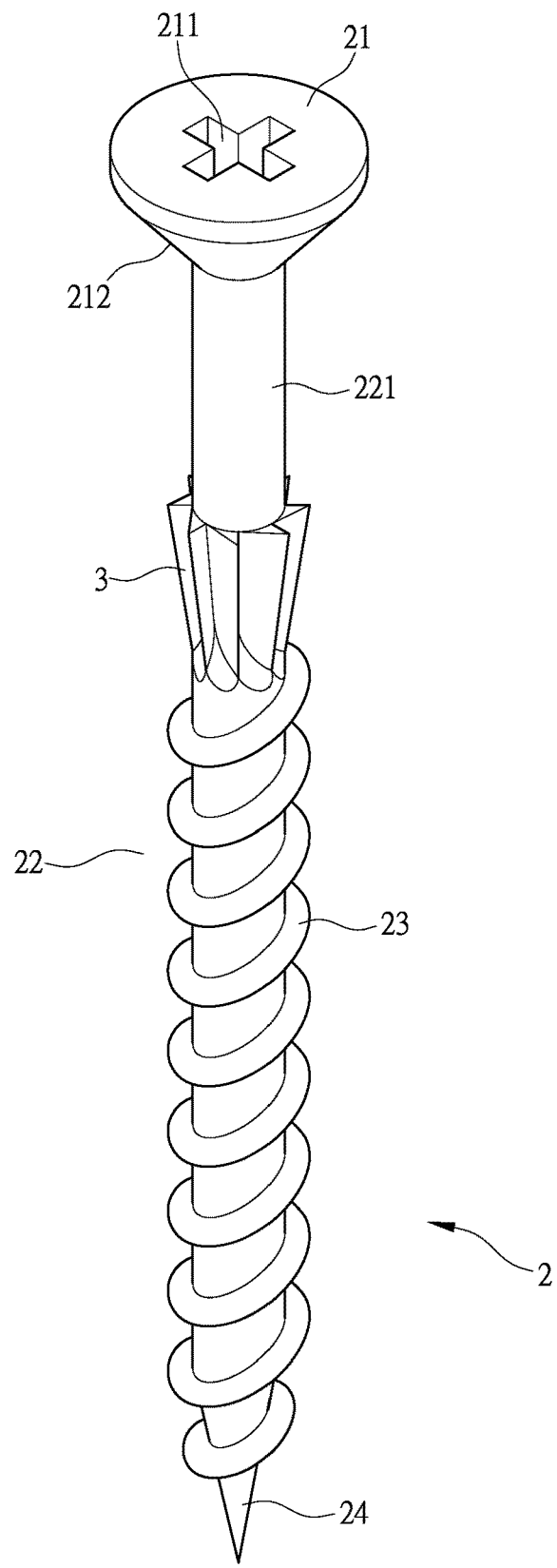
FIGS. 6 and 6A show a further embodiment in which a reverse prevention mechanism is provided on a neck of a screw shank.

As shown in FIG. 6, a reverse prevention mechanism 3 that is arranged between a lower end of the conic section 212 of the screw cap 21 and an upper end of the thread 23 is constructed to extend upward from the upper end of the thread 23, but does not extend to the conic section 212 of the screw cap 21. More specifically, a portion of the neck section 221 that is between an upper end of the reverse prevention mechanism 3 and a lower end of the conic section 212 of the screw cap 21 is provided with no thread 23, and the reverse prevention mechanism 3 is constructed to comprise at least one step structure arranged in the direction of the thread 23 so as to enhance the reverse prevention effect of the screw 2.

Figure 6A:
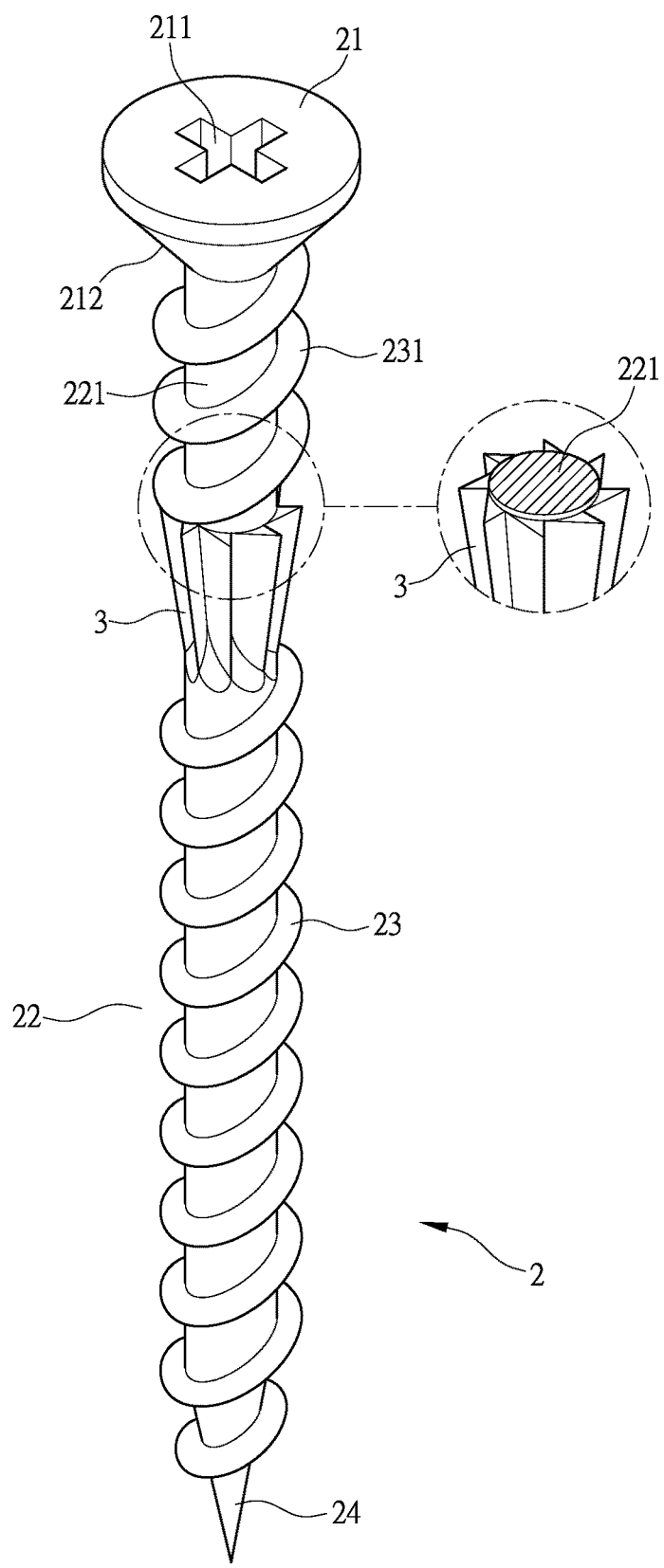

As shown in FIG. 6A, the neck section 221 of the shank 22 that is between the lower end of the conic section 2121 of the screw cap 21 and the reverse prevention mechanism 3 is provided with a neck thread 231. The neck thread 231 has an outside diameter that is equal to or slightly greater than an outside diameter of the reverse prevention mechanism 3 and as such, the neck thread 231 can also be screwable into the workpiece to provide a screwing and fixing effect and thus enhancing the reverse prevention effect of the screw 2.

Figure 7:
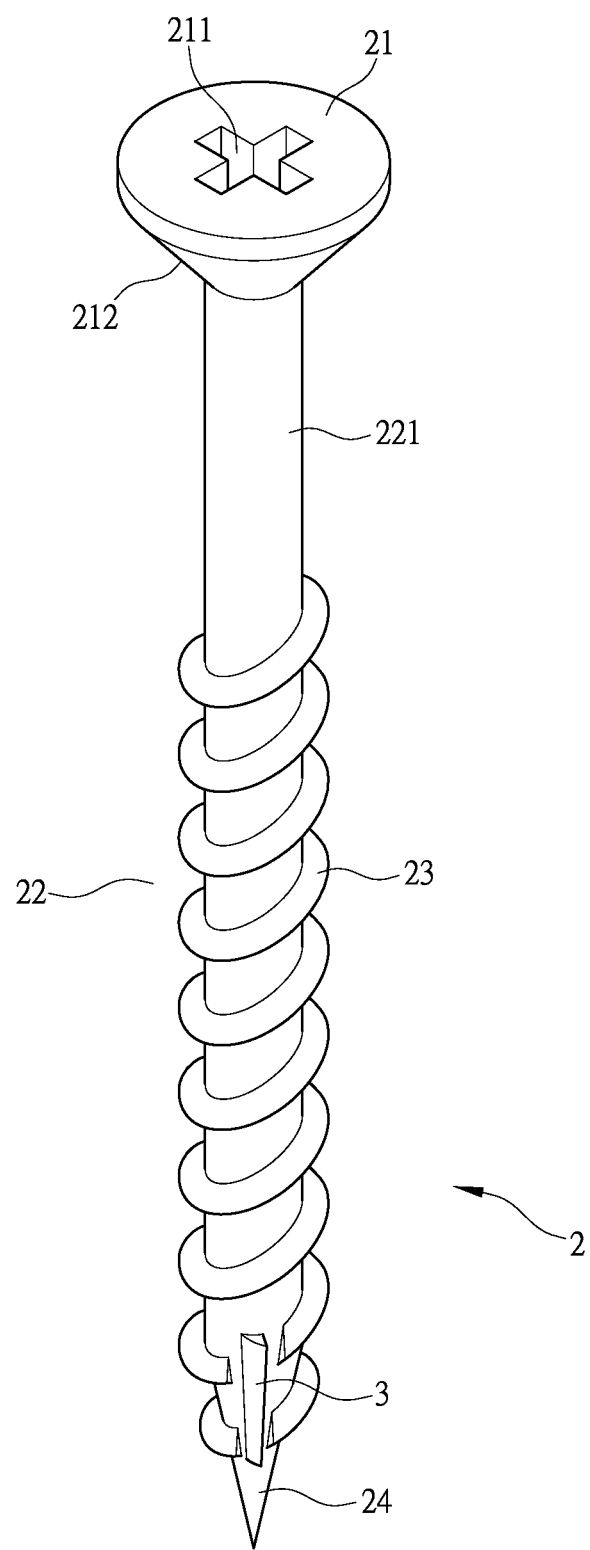
FIGS. 7 and 7A show an embodiment in which a reverse prevention mechanism is provided on a screw tip.

As shown in FIG. 7, the screw 2 of the present invention is provided with a reverse prevention mechanism 3 formed at the tip section 24. A neck section 221 located under the conic section 212 of the screw cap 21 is provided with no thread 23. The reverse prevention mechanism 3 is constructed to comprise at least one step structure arranged in the direction of the thread 23 so that when the screw 2 is screwed into a workpiece, the tip section 24 is also screwed into the workpiece and in an attempt to screw the screw 2 out of the workpiece, the reverse prevention mechanism 3 provides a blocking and resisting effect to prevent the screw 2 from being readily screwed out of the workpiece and thus, the reverse prevention effect of the screw 2 can be enhanced.

Figure 7A:
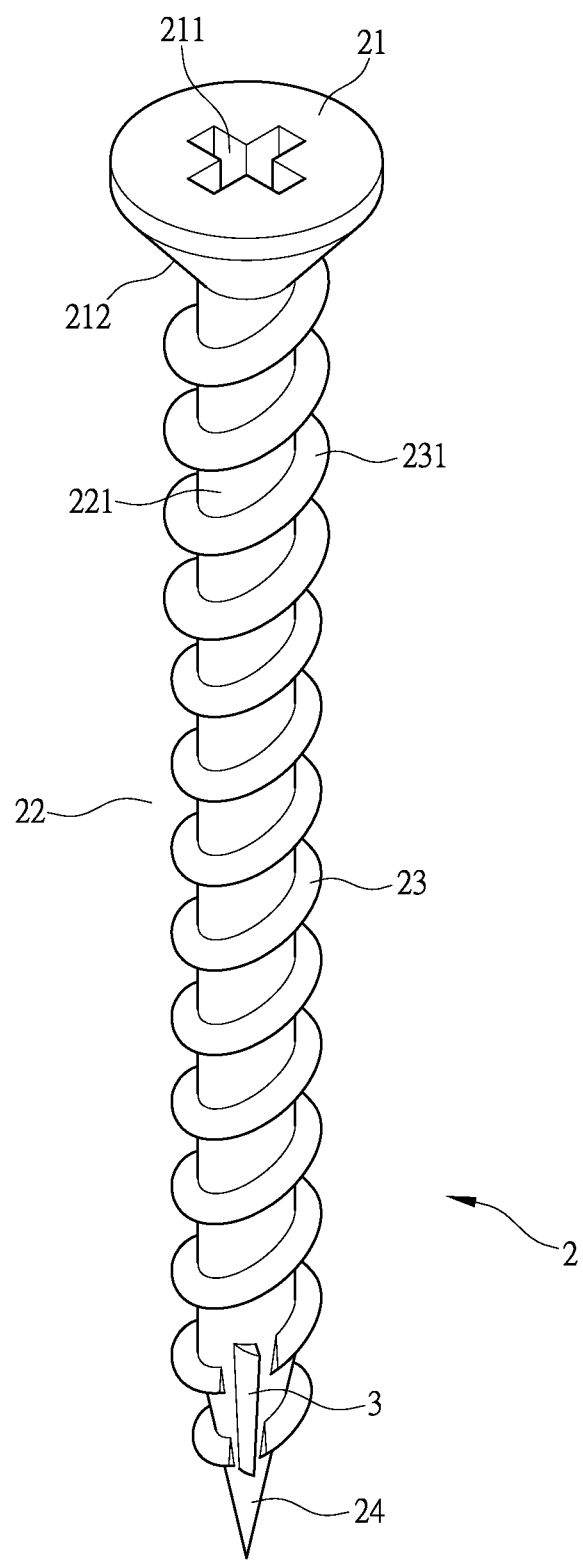

As shown in FIG. 7A, the neck section 221 that is located at the lower end of the conic section 212 of the screw cap 21 is provided with a neck thread 231. In other words, the thread 23 of the shank 22 is arranged, as a whole, to extend from the screw cap 21 to the tip section 24, so that the neck section 221 at the lower end of the conic section 212 of the screw cap 21 is also screwable into a workpiece to provide a screwing and fixing effect and thus enhancing the reverse prevention effect of the screw 2.

Figure 8:
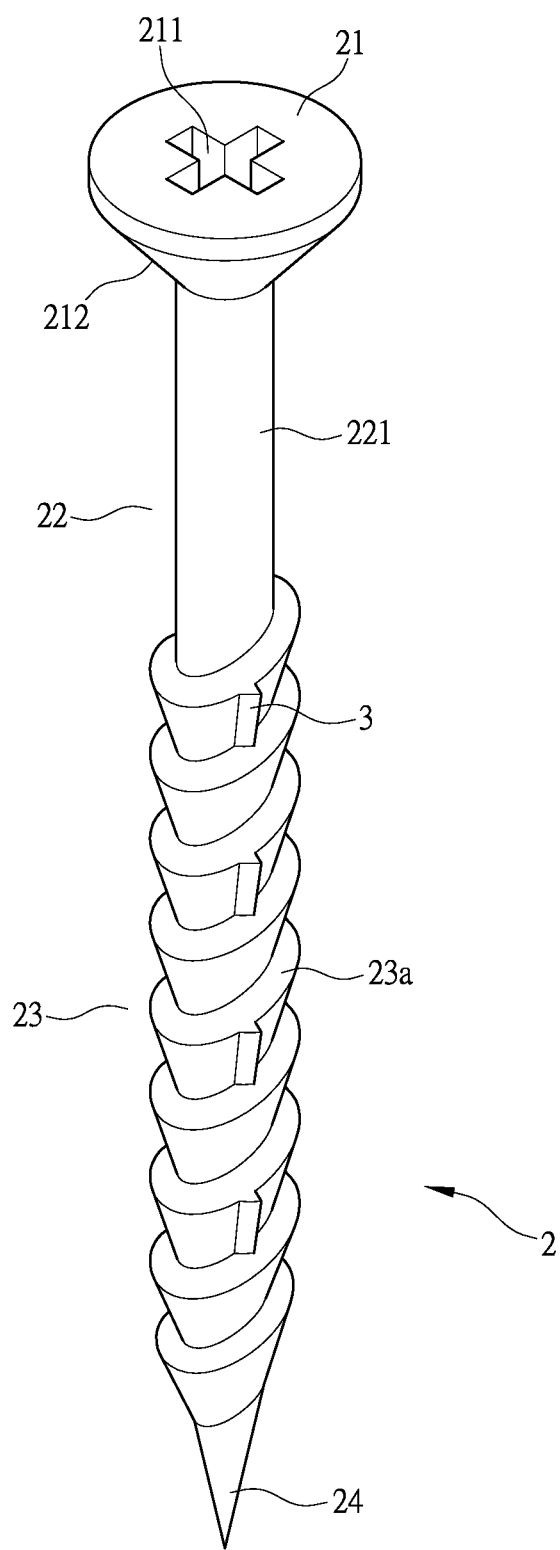
FIGS. 8, 8A, and 8B show another embodiment of a thread of a screw according to the present invention.

As shown in FIG. 8, the neck section 221 at the lower end of the conic section 212 of the screw cap 21 of the screw 2 of the present invention is provided with no thread 23. The screw 2 is provided with a reverse prevention mechanism 3 arranged on the thread 23. The thread 23 is an umbrella-shaped thread 23a, and the reverse prevention mechanism 3 is constructed to comprise at least one step structure arranged in the direction of the umbrella-shaped thread 23a. As such, with the screw 2 being screwed into a workpiece, in an attempt to screw the screw 2 out of the workpiece, the reverse prevention mechanism 3 provides a blocking and resisting effect to prevent the screw 2 from being readily screwed out of the workpiece and thus, the reverse prevention effect of the screw 2 can be enhanced.

Figure 8A:
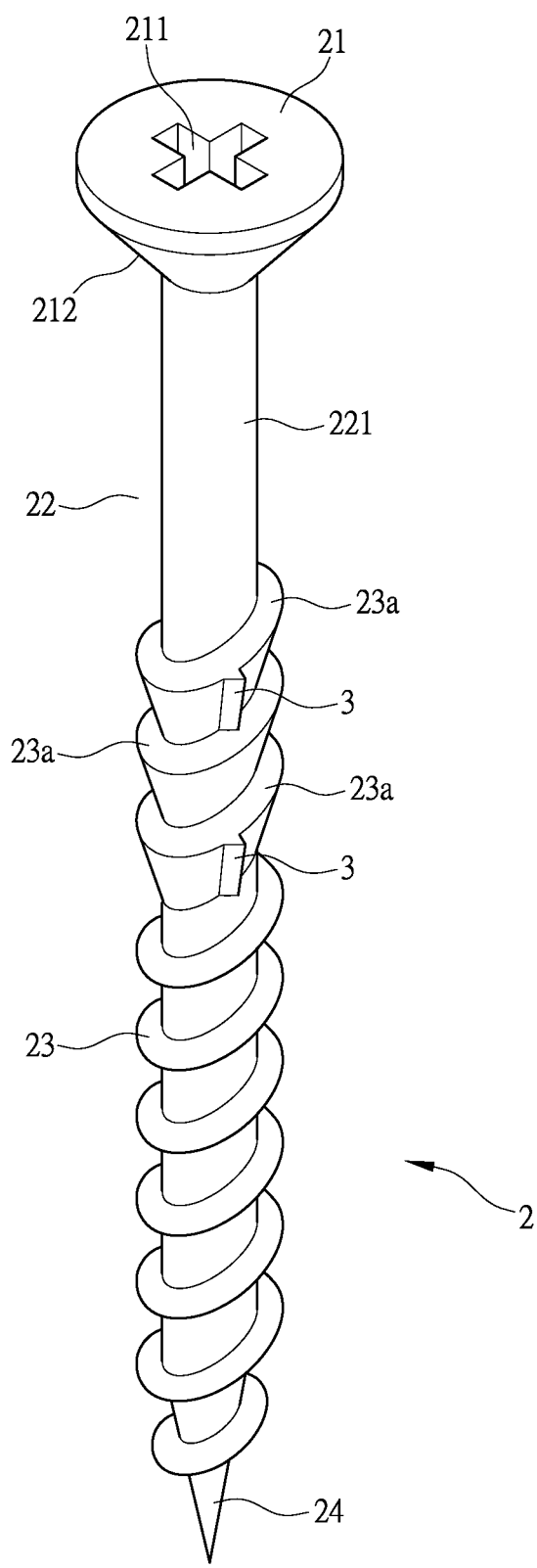

As shown in FIG. 8A, the neck section 221 located at the lower end of the conic section 212 of the screw cap 21 of the screw 2 is provided with no thread 23. The screw 2 comprises a thread 23 that has a regular tooth- or ridge-like thread extending from the thread 23a that is provided with the reverse prevention mechanism 3 to the tip section 24. In other words, the thread 23 that has a regular-shaped thread is arranged to extend from a lower end of the umbrella-shaped thread 23a toward the tip section 24. The thread 23 has an outside diameter equal to or slightly greater than an outside diameter of the reverse prevention mechanism 3 so as to enhance the reverse prevention effect of the screw 2.

Figure 8B:
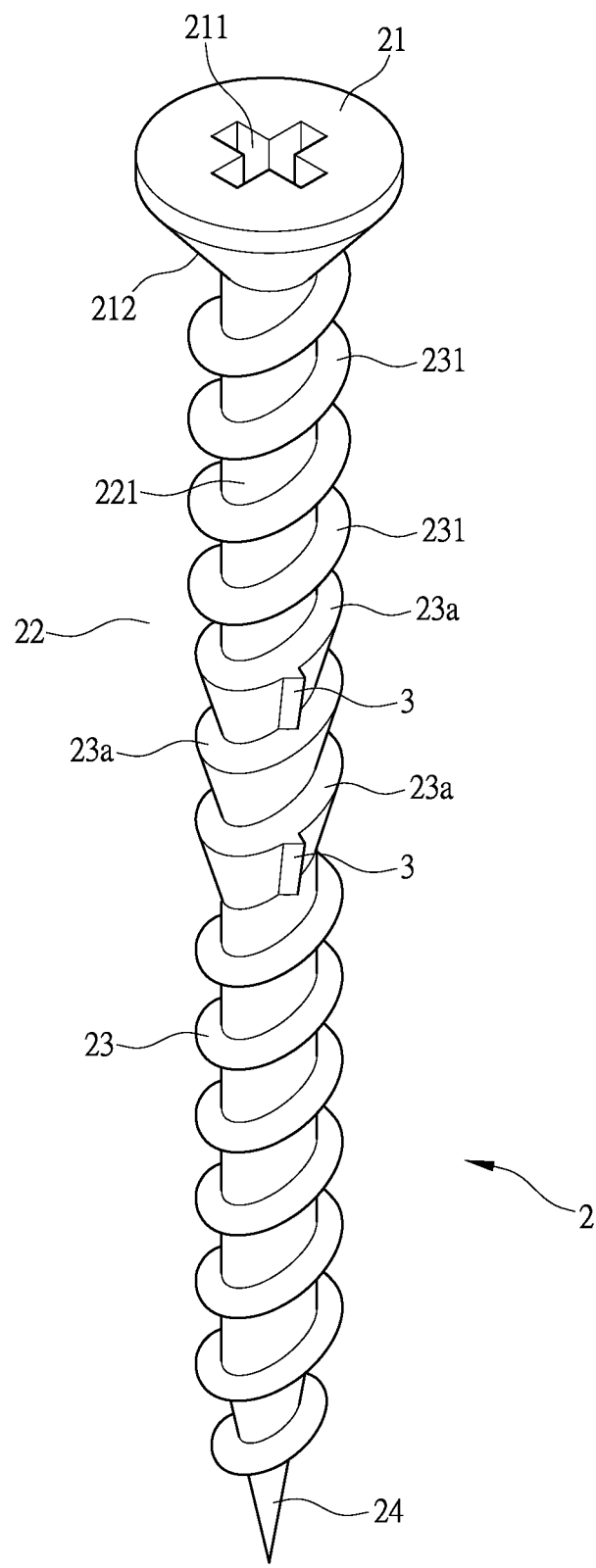

As shown in FIG. 8B, the neck section 221 at the lower end of the conic section 212 of the screw cap 21 is provided with a neck thread 231. In other words, the thread 23 of the shank 22, as a whole, extends from the screw cap 21 to the tip section 24, and the screw 2 comprises sections that comprise threads 23 having regular-shaped thread formed in the neck section 221 and from the reverse prevention mechanism 3 toward the tip section 24. In other words, the portion from the upper end of the umbrella-shaped thread 23a to the neck section 221 of the screw 2 and the portion from the lower end of the umbrella-shaped thread 23a to the tip section 24 are threads 23 having regular thread configuration and the threads 23 have an outside diameter that is equal to or slightly greater than an outside diameter of the reverse prevention mechanism 3. As such, the neck section 221 located below the conic section 212 of the screw cap 21 is also screwable into the workpiece to provide a screwing and fixing effect thereby enhancing the reverse prevention effect of the screw 2.

Figure 9:
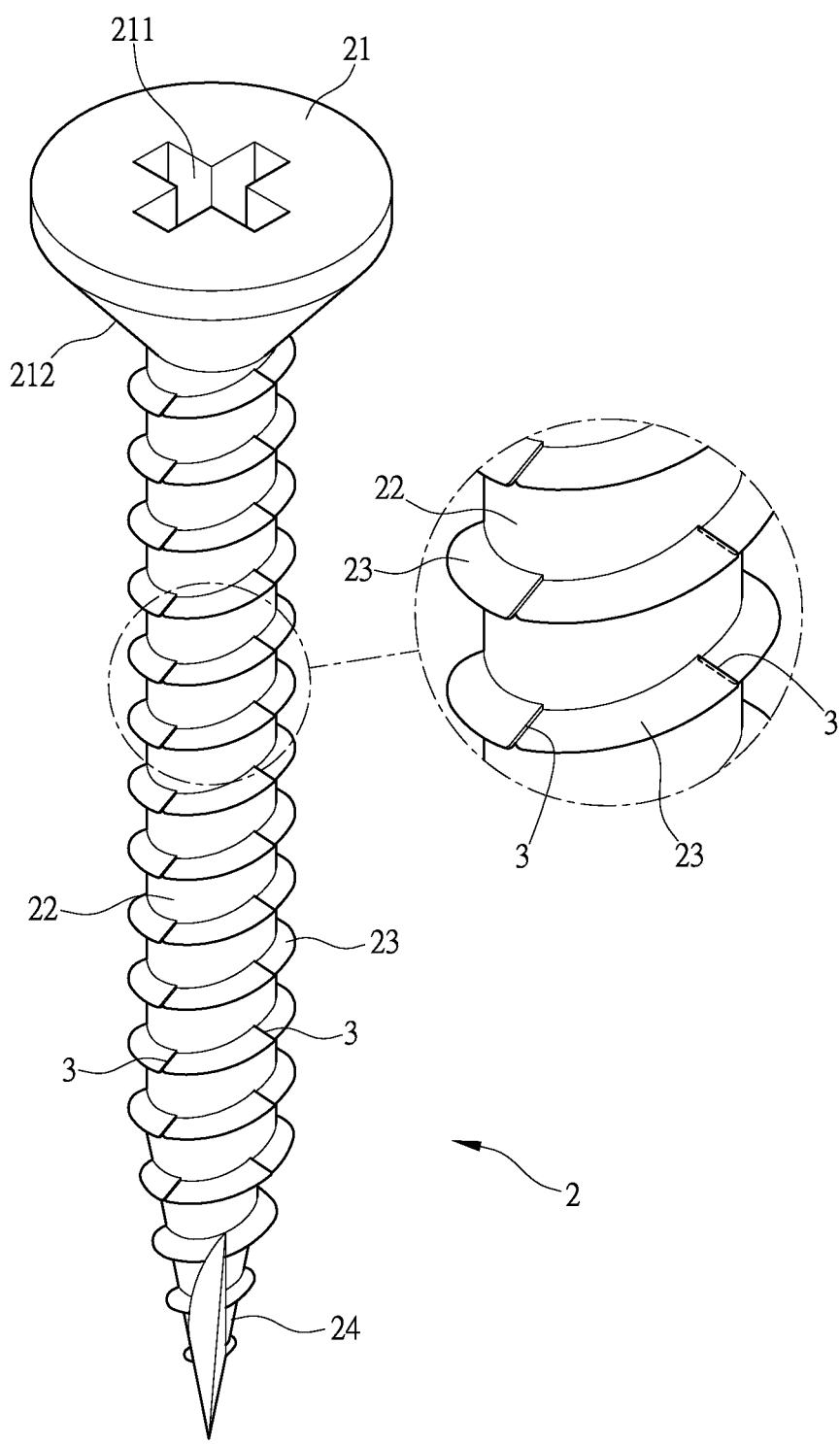
FIG. 9 shows a reverse prevention mechanism provided on a screw thread.

As shown in FIG. 9, a screw 2 of the present invention comprises a thread 23 that extends from a screw cap 21 to a tip section 24. The screw 2 is provided with a reverse prevention mechanism 3 arranged on the thread 23. The reverse prevention mechanism 3 is constructed to comprise at least one step structure arranged in the direction of the thread 23. As such, with the screw 2 being screwed into a workpiece, in an attempt to screw the screw 2 out of the workpiece, the reverse prevention mechanism 3 provides a blocking and resisting effect to prevent the screw 2 from being readily screwed out of the workpiece and thus, the reverse prevention effect of the screw 2 can be enhanced.

The efficacy of the present invention is that, in a screw 2, a reverse prevention mechanism 3 is provided on a conic section 212 of a screw cap 21 or a neck section 221 of a shank 22 or a tip section 24 and the reverse prevention mechanism 3 is constructed to comprise at least one step structure. As such, with the screw 2 being screwed into a workpiece, in an attempt to screw the screw 2 out of the workpiece, the reverse prevention mechanism 3 provides a blocking and resisting effect to prevent the screw 2 from being readily screwed out of the workpiece and thus, the reverse prevention effect of the screw 2 can be enhanced and the overall effectiveness of use of the screw 2 is improved.

It will be understood that each of the elements described above, or two or more together may also find a useful application in other types of methods differing from the type described above.

While certain novel features of this invention have been shown and described and are pointed out in the annexed claim, it is not intended to be limited to the details above, since it will be understood that various omissions, modifications, substitutions and changes in the forms and details of the device illustrated and in its operation can be made by those skilled in the art without departing in any way from the claims of the present invention.

I claim:

1. A screw, comprising a screw cap and a shank extending downward from the screw cap, the shank having an outside circumferential surface on which a thread is formed, the shank having a lower end forming a tip section, the screw cap being extended downward to form a conic section, the screw comprising a thread that extends from the screw cap to the tip section, the screw being provided with a reverse prevention mechanism arranged on an upper surface or a lower surface of the thread, the reverse prevention mechanism being constructed to comprise at least one step structure arranged in the direction of the thread.

2. The screw according to claim 1, wherein the screw cap has a top on which a rotating section is formed.

* * * * *